(12) United States Patent
Pazel et al.

(10) Patent No.: US 6,683,624 B1
(45) Date of Patent: Jan. 27, 2004

(54) SYSTEM AND METHOD FOR MANAGING PROGRAMMING OBJECT VISUAL REPRESENTATIONS PARTICIPATING IN ALTERNATIVE EXECUTION PATHS

(75) Inventors: Donald P. Pazel, Montrose, NY (US); Marcel R. Karam, Nova Scotia (CA)

(73) Assignee: International Business Machines Corporation, Armonk, NY (US)

( * ) Notice: Subject to any disclaimer, the term of this patent is extended or adjusted under 35 U.S.C. 154(b) by 537 days.

(21) Appl. No.: 09/639,931

(22) Filed: Aug. 17, 2000

(51) Int. Cl.$^7$ .............................. G06F 9/44; G06F 9/45; G09G 5/00
(52) U.S. Cl. .................... 345/763; 345/619; 345/655; 345/961; 717/114; 717/116; 717/150; 717/154
(58) Field of Search ................................ 345/418–419, 345/700, 762, 764, 866, 810, 835, 473–474, 961, 965, 966, 967, 853, 769, 763, 781, 584, 587, 619–621, 629, 630, 643, 650, 655, 661, 597, 663, 670, 671, 676, 678, 723, 765, 530, 536, 541, 543–549, 593, 959; 700/1, 11–12, 17–18, 103, 83, 86–87; 717/100, 113, 106–116, 123–127, 150, 154, 160–165; 707/528, 530, 516–520

(56) References Cited

U.S. PATENT DOCUMENTS

| | | | | |
|---|---|---|---|---|
| 5,832,270 A | * | 11/1998 | Laffra et al. ................ 717/125 |
| 6,052,515 A | * | 4/2000 | Bruckhaus ..................... 716/1 |
| 6,182,024 B1 | * | 1/2001 | Gangopadhyay et al. ..... 703/22 |
| 6,192,511 B1 | * | 2/2001 | Johnston et al. ............ 717/109 |
| 6,426,761 B1 | * | 7/2002 | Kanevsky et al. .......... 345/788 |
| 6,441,835 B1 | * | 8/2002 | Pazel ......................... 345/769 |
| 6,446,081 B1 | * | 9/2002 | Preston .................... 707/104.1 |
| 6,489,970 B1 | * | 12/2002 | Pazel ......................... 345/763 |

* cited by examiner

*Primary Examiner*—Matthew C. Bella
*Assistant Examiner*—Wesner Sajous
(74) *Attorney, Agent, or Firm*—Whitham, Curtis & Christofferson, P.C.; Stephen C. Kaufman

(57) ABSTRACT

A method and apparatus for depicting programming state of programming objects through a combination of associating semantic stat space with programming objects, updating semantic state through affiliated state updates with each programming action, and resolving the alternative programming states with a convergence operator defined on the semantic state space of the programming object type. The state reflection process is further defined in cases where the visual programming object participates in multiple execution paths, as would be the case in, for example, an IF statement wherein the variable is used on both the Left and Right sides. More particularly, this technique resolves these differing states back into a single state representation for the programming object.

9 Claims, 8 Drawing Sheets

```
10   IF r==S  {

20   O.i=O.j*3,
     {ELSE{

30   O.i=O.j/4i
   {
```

SYSTEM AND METHOD FOR MANAGING PROGRAMMING OBJECT VISUAL REPRESENTATIONS PARTICIPATING IN ALTERNATIVE EXECUTION PATHS

CROSS-REFERENCE TO RELATED APPLICATION

The subject matter of this application is related to that disclosed in U.S. patent application Ser. No. 09/409,277 filed Sep. 30, 1999, by Donald P. Pazel for "Utilizing Programming Object Visual Representations for State Reflection", and assigned to a common assignee herewith. The disclosure of application Ser. No. 09/409,277 is incorporated herein by reference.

BACKGROUND OF THE INVENTION

1. Field of the Invention

The present invention generally relates to the field of visual programming languages and object-oriented programming languages and, more particularly, to managing programming object visual representations participating in alternative execution paths.

2. Background Description

The use of state reflection in visual programming, as described in copending application Ser. No. 09/409,277, is a novel idea not found in the state of the art in visual programming. For the most part, visual programming languages fall into the following categories:

Visual Designers—These are visual programming languages, which focus on the construction of user interface applications. Much of the focus is on interface form and presentation construction with caveats for generating event code to facilitate textual programming of other parts of an application.

Wiring-Based Languages—These languages have visual representations of programming entities, such as objects or processes. Programming proceeds by creating and connecting visual representations with lines, which typically indicate data or event flow.

Structured-Logic Based—These focus on structuring the logic of a program. Typically logic is represented with nested graphical figures which represent logical entities, e.g. if, loops, etc. Typically visual representations of programming objects are not shown in these tools.

Form-Based—These are visual programming languages of the spreadsheet genre. Typically represented as grids or arrays of numbers, a textual macro language typically accompanies the language to do more complex manipulations.

The visual programming approach found in copending application Ser. No. 09/409,277 strongly identifies a programming artifact, also known as a programming object, such as a variable, or data structure, with its visual representation. It furthers the state of the art in visual programming by defining a programming state, also known as a usage state or semantic state, for these artifacts and reflects this state visually in the visual representation of the programming object. From a sequential programming viewpoint, the semantic state of a programming object at a given point of a program indicates statically analyzed properties of a programming object, as contrasted to run-time or execution-time values. Examples include "the variable x has been set" or "the variable y has a non-negative value". For a given programming object, the set of all possible states that could be assigned to it is called the semantic state space of the programming object.

For a programming object at a given point in the program, its semantic state information is presented to the user in a visually meaningful manner. In other terms, the program object's visual presentation reflects how the programming object had been used and modified logically up to some specified point in the program, in the statically analyzed context of the entire program.

Conventional sequential programming provides a number of logical constructs that are problematic to this approach. These include the familiar, IF, CASE, WHILE, FOR, UNTIL programming structures. The first two cases, or CHOICE constructs, encompass multiple alternative logical or execution paths to be defined. The latter three my be categorized as LOOP constructs, which while they identify a single sequential path, in fact, identify a multitude of paths by way of iterations.

The difficulty that arises here is that each alternative logical path defines its own semantic state for each programming object, and in particular, at the end of each path, these alternative programming states of any one programming object need to be combined to one state, representing the total impact of the logical construct on each programming object. More concretely, for a variable "x" in an "IF" statement, if one path sets "x" and the other does not, the impact of the "IF" statement should be "x may be set". Thus, the ideal solution is to produce for each programming object, a composite semantic state that is true across all alternatives, as in the example above, to represent the semantic impact of the logical statement on the programming object. This resolution of semantic state is the subject matter of this disclosure.

SUMMARY OF THE INVENTION

It is therefore an object of the present invention to provide a method and apparatus for maintaining programming artifact usage state, which in the context of multiple alternative coding paths, produces a converged state for those alternatives.

This invention builds on the disclosure of copending application Ser. No. 09/409,277. The basis of that disclosure is that programming objects have semantic usage state that can be represented visually. As programming proceeds during program editing, the usage state of the programming objects are reflected back to the visual representations. All of this happens at program editing time. By way of illustration only, if "x=3" were coded, the variable x would be set to green indicating it has been set to a constant.

This invention relates to an addition to the state reflection process relating to cases where the visual programming object participates in multiple execution paths. This would be the case, for example, if it were used in the TRUE and/or FALSE bodies of an IF statement. In this instance, the programming object's usage state evolves differently in both paths. To proceed with this co-evolution of state requires a duplication of the programming object's usage state on entry to the logical construct. The process of constructing a multiplicity of state replicas for alternative paths is called divergence. Ideally, at the end of the IF statement, the two states should be merged into a single usage state on the programming object, before proceeding. This invention specifies processes for managing these alternative states, as well as provisions for merging states, a process called convergence. This approach is useful in providing a single state, reflecting prior use and logical modification up to any point in the program, including the impacts of alternative execution paths induced by logical constructs.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention relates to a method and apparatus for utilizing graphical elements for programming objects to reflect programming state, at the program construction or editing time. This invention is an extension of the invention disclosed in copending application Ser. No. 09/409,277 in its accommodation of alternative execution paths induced by logical constructs. In preferred embodiments of the invention, a number of different types of programming objects may be graphically represented including but not limited to local and global variable. These include variables of common types such as, but are not limited to, integer, real, string, character, and Boolean, as well as untyped objects. They also include objects that are derivatives or composites of these and other variables, such as is taught in object-oriented technology; i.e., programming objects based on the classic object-oriented methodology.

The present invention refers to graphical elements as the means by which these objects are displayed on a computer. In general, in preferred embodiments of the present invention, these include graphical elements such as, but not limited to, squares, ellipses, and irregular shapes. Properties of these elements include, but are not limited to, size, color, border type, and border color. However, in some embodiments of the present invention, other geometric shapes such as trapezoids, triangles, and the like are also contemplated. In addition, non-traditional, graphical elements, which rely on techniques of three-dimensional figures, animations, and the like, are contemplated. Accordingly, the method and apparatus of the present invention is not limited to any one type of graphical element for the representation of programming elements.

Figure 1:
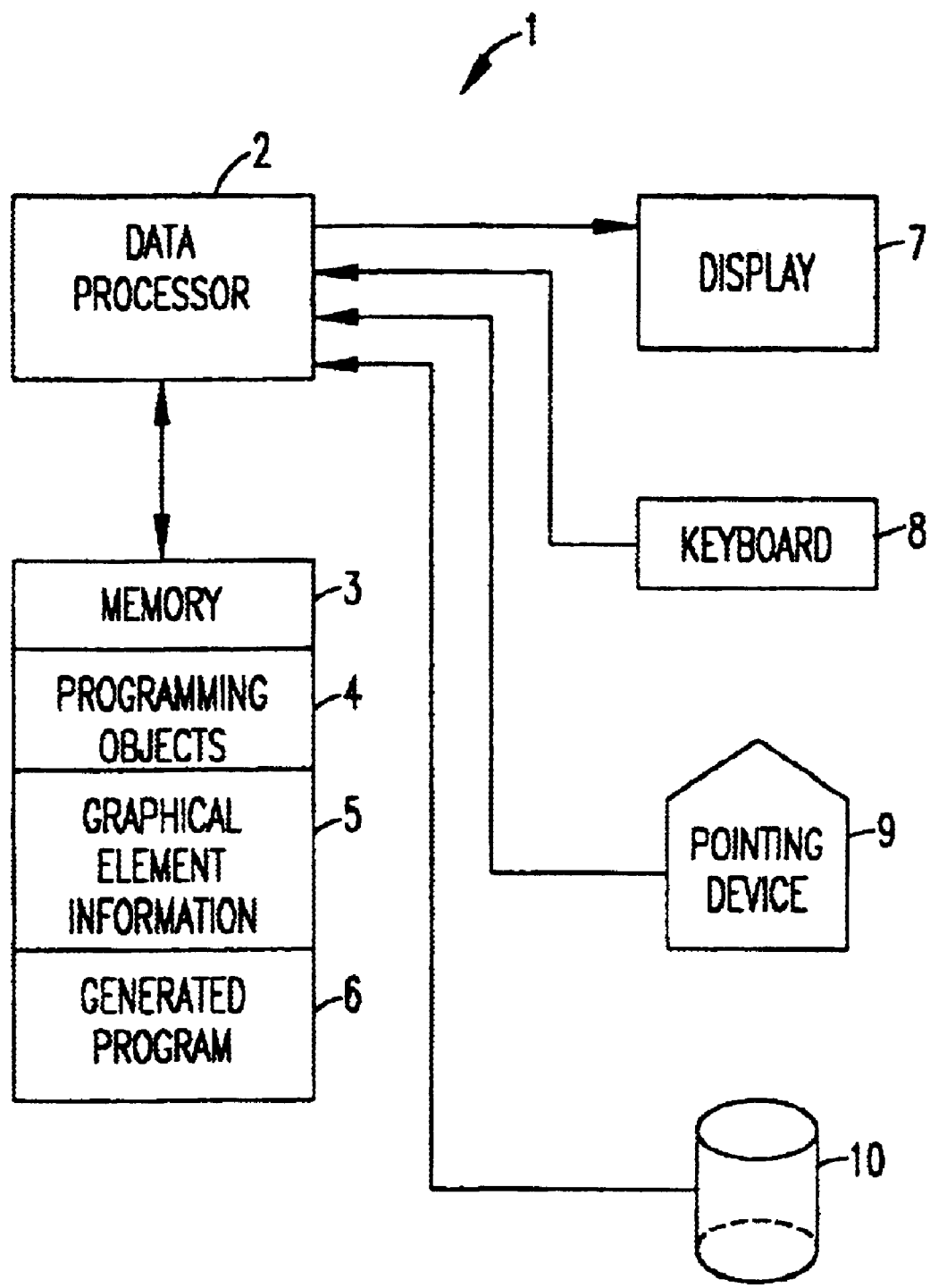
FIG. 1 is a block diagram a data processing system for the visual programming language of this invention.

Referring now to the drawings, and more particularly to FIG. 1, there is shown a block diagram of a data processing system 1 for a visual programming language of the present invention, as described above. In preferred embodiments of the invention, the data processing system 1 is an IBM Aptiva computer (IBM and Aptiva are both registered trademarks of the International Business Machines Corporation). However, other data processing systems are also contemplated for use by the present invention. For example, the invention can be implemented using a plurality of separate electronic circuits or devices (e.g., hardwired electronic or logic circuits, or programmable logic devices such as programmable logic arrays (PLAs), or the like). A suitable programmed general, purpose computer, e.g., a microprocessor, microcontroller or other processor device, either alone or in conjunction with one or more peripherals, data and signal processing devices can be used to implement the invention. In general, any device, or assembly of devices on which a finite state machine capable of implementing the flow charts shown in the figures can be used as a controller with the invention.

Referring again to FIG. 1, the data processing system 1 of the present invention comprises a data processor 2 having a memory 3. The memory 3 is coupled to the data processor 2 via a bidirectional bus. In preferred embodiments, the memory 3 includes program and data memory. The memory also includes information about the programming objects 4, including both semantic information such as type and structure, as well as programming state such as how it is used and set. It also contains graphical element information 5, including graphical information representing the programming objects 3. The memory includes information 6 about the program generated by the programming objects.

We use the term programming state in the same manner as it was utilized in copending application Ser. No. 09/409, 277. State refers to an identification of the outcome or impact of programming that has occurred to a programming entity. For example, a variable may be set or not set and can be simply represented by a Boolean variable. As reflected to a visual, by way of example only, the unset visual representation may be colored red or green for unset or set, respectively.

The graphical element information 5 (e.g., programming objects represented as graphical elements) is displayed on the display 7, which is coupled to the data processor 2. In preferred embodiments of the invention, a user data entry device 8 (e.g., keyboard or other interactive device) and a pointing device 9 (e.g., a mouse or a trackball) are also coupled to the data processor 2.

In preferred embodiments of the invention, the display 7 provides a presentation space in order to display the programming objects of the present invention. Either the pointing device 9 or predefined keys of the data entry device 8 may be used to manipulate the data in conformity with the present invention. This is not to restrict the practice of the invention to these specific human input devices, but they are only mentioned here as the most common types of input devices. Data-gloves, joysticks, and other non-conventional input devices are also contemplated for utilization with this invention.

It is also contemplated, for preferred embodiments of the invention, that a persistent storage mechanism 10 may exist and be utilized to store the program information 6. This type of storage media may include, but is not limited to, standard disk drive technology, tape, or flash memory. In preferred embodiments of the invention, the program information may be both stored onto the persistent media, and/or retrieved by data processing system 1 for execution. It is also anticipated that sufficient -information about programming objects and their graphical elements may be stored and/or retrieved in such a fashion as to allow the further modification of the generated program utilizing the stored information about the programming objects 4 and graphical element information 5.

Figure 2:
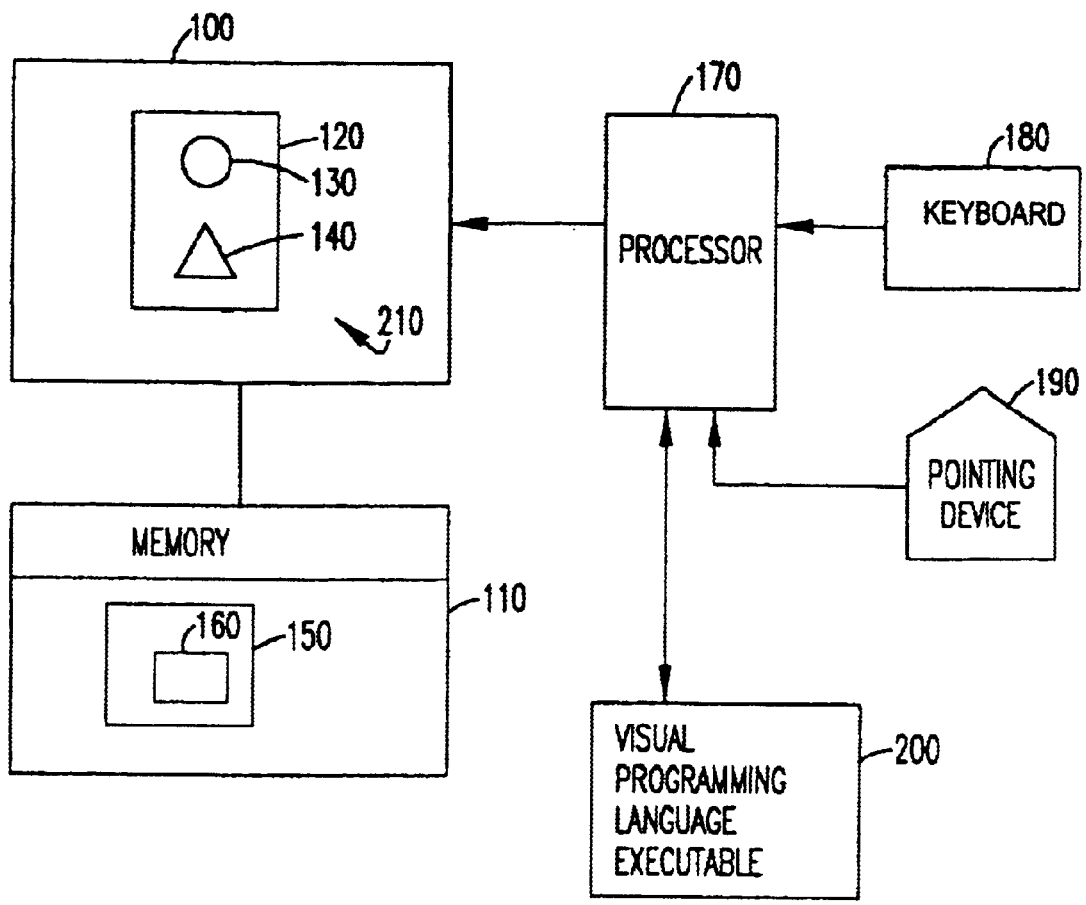
FIG. 2 is a block diagram showing the relationship between programming objects and their graphical rendering in the present invention.

Referring now to FIG. 2, there is shown a block diagram of a visual programming language of the present invention running on a processing system as just described. This diagram illustrates the relationship between the programming objects 150 and 160 in memory 110 and their visual rendering on the display 100. In this example, programming object 150 logically contains within it a programming object 160. By way of illustration, 150 may represent a variable in a visual programming language representing information about a person, and 160 may represent a variable, logically contained within the variable 150, in a visual programming language representing the person's name. As a matter of distinction of importance, these do not represent actual instances of data for person and name, but rather, by being a variable, are an abstract representation for person and name utilized in building a program within a visual programming language.

The display 100 shows a number of graphical elements of various shapes and sizes. Again, this is by way of illustration, and this invention is not to be construed in any way to be limited to aspects of this illustrative rendering. This diagram is intended to show that graphical elements 120, 130 and 140 provide a visual representation of the programming object. Note that the separate graphical elements are in no necessarily particular containing relationship, nor in any size or any other aspect of relationship. All that is illustrated is that the aggregate of these graphical elements represents the programming object 150. This association between programming object and graphical elements is presumably defined in some appropriate methodology, for example a graphical editor or through some textual definition. This method is considered routine and is of no particular consequence to this invention.

In FIG. 2, the graphical elements 130 and 140 represent the name programming variable 160 that is logically contained within the programming variable 150. Graphical element 120 corresponds to the programming element 150. As a separate issue, this illustrates the possible reusable nature of the mapping of programming objects to graphical elements. In this case, a pre-existing relationship between programming variable 160 and its graphical elements may be assumed to have been once defined, and reused in defining the relationship between programming object 150 and its graphical elements.

Manipulation of the graphical elements shown on the display 100 is achieved through, but not limited to, the means mentioned in FIG. 1. As is typical to the industry, and by way of illustration, a pointing cursor 210 is utilized on the screen of manipulating graphical elements using the pointing device 190 (e.g., a mouse). Any of the general techniques of that interaction can be used, including but not limited to, moving, pushing (as in pushing buttons), and drag-and-drop. Alternatively, similar effects can be had utilizing a keyboard 180.

Again in FIG. 2, the visual programming language is an executable program 200 running on the processor 170. The visual programming language program provides the logic for translating manipulations of graphical elements on the display to manipulations of programming objects in memory. It also provides a means for sending appropriate instructions to the processor 170 and the display 100 in order to render appropriately the graphical elements, which visually represent the programming objects in memory.

Figure 3:
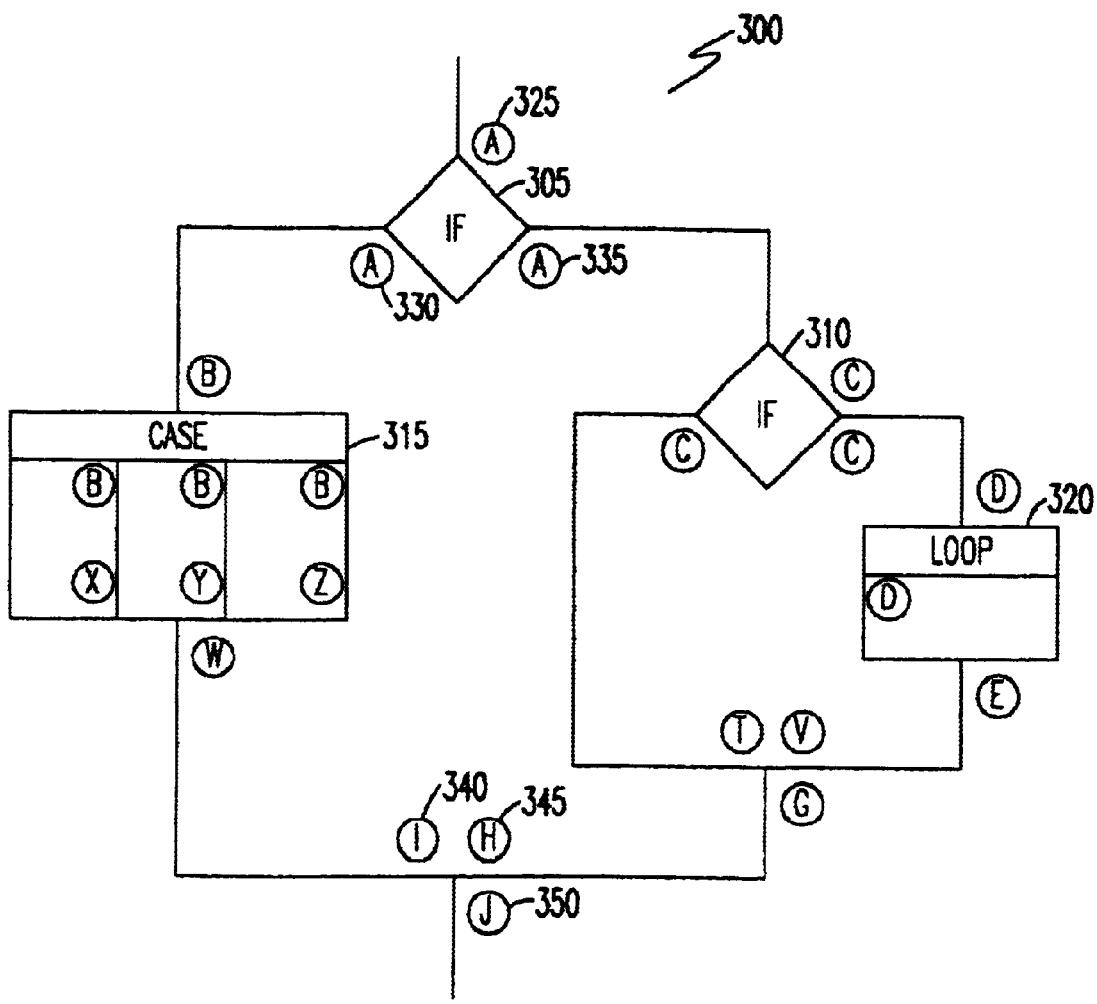
FIG. 3 is a flowchart showing the basic notion of state reflection.

Referring now to FIG. 3, there is shown a flow diagram explaining the novelty of this invention. FIG. 3 depicts a simple programming logic flowchart 300. It consists of IF statements 305 and 310, a case statement 315, and a loop 320. This diagram depicts the different states of one programming object in different parts of these logical constructs, as well as the fundamental operations that must occur while the programming object is used in the logic. We will assume that along any path (lines), sequential programming statements (non-branching) are placed that affect the state of the programming object. These sequential statements are not depicted in order to bring focus on logical construct influence on programming object state. That means that along any line, the beginning and end programming state of the programming object can be different.

Again in FIG. 3, a programming object enters the IF 305 in state A, 325. The programming object then will be in state A along both paths of the IF immediately. That is, the programming object in state A is duplicated for each path as programming objects 330 and 335, being in state A. Similar replications are made at the CASE statement 315, the IF statement 310, and the LOOP statement 320. This process of duplication at entry to a logical construct is called divergence. The duplicated instances at the same state are called alternatives.

The counterpart to divergence is called convergence. Again in FIG. 3, note the application of convergence at the conclusion of the IF 305. Here the programming object has states I and H, 340 and 345, for the two paths of the IF. Convergence is a process whereby these two states are merged into one. In this case, the composite state J 350 is produced.

The notion of convergence is given very generically here. The outcome of a convergence is dependent on the states of the alternatives fed to it. As a simple practical rule however, but not restricting the means to this policy, state may be set in ways that indicate, for example, the setting, the non-setting, or the possible setting of variables. For example if variable A is in an unset state on entry to an IF, set on one side of the IF, and not set on the other, the converged state is simply that it is possibly set. This convergence policy is easily implemented by anyone skilled in the art of programming.

Figures 3A, 3B:
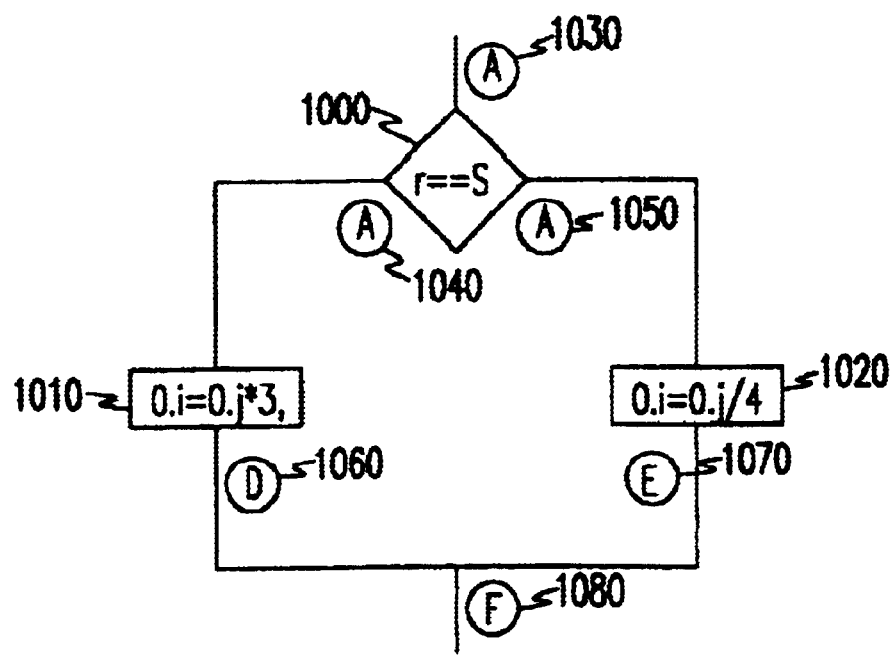
FIGS. 3A and 3B are, respectively, a programming fragment and a corresponding control flow graph of an illustrative example.

As further clarification of these concepts, the following example is presented. This serves purely for illustration only and in no way should be construed as limitations to this teaching. FIG. 3A is a programming fragment also depicted in the control flow graph in FIG. 3B. The focus of this example is the programming state of object O having data elements i and j. The logical IF construct has a conditional on line 10 of FIG. 3A, and execution paths at lines 20 and 30, corresponding to the outcome of testing the conditional. Lines 20 and 30 are programming statements which change the value of data element i of object O. It will be assumed, by way of illustration only, in this example that a statement that semantically changes element i invokes a change in the programming state of object O.

Turning now to FIG. 3B, lines 10, 20 and 30 of FIG. 3A correspond to 1000, 1010 and 1020. Object O initially has state A, 1030 at the entry to the IF construct. Its state is replicated at each alternative path 1040 and 1050, illustrative of the process of divergence. Due to the programming state changes induced by the assignments 1010 and 1020, the replicas of 0, 1040 and 1050, take on two new states D, 1060, and E, 1070, respectively. At the conclusion of the IF construct, a new converged state H, 1080, is formed out of the states D and E. The converged state F, typically, and in the context of this example only, would represent a state corresponding to the fact that either assignment 1010 or 1020 may occur in any execution.

In a simple extrapolation of this example, and by way of illustration, we have the following consideration. If in FIG.

3B, the assignment 1020 did not exist, the convergence would be formed simply out of states D 1060 and A 1050. Similarly, if the assignment 1010 did not exist, the convergence would be formed out of states A 1040 and E 1070. Finally, it should be noted that if neither assignment 1010 nor 1020 updated the state of object O, the converged state at 1080 would simply be A.

Figure 4:
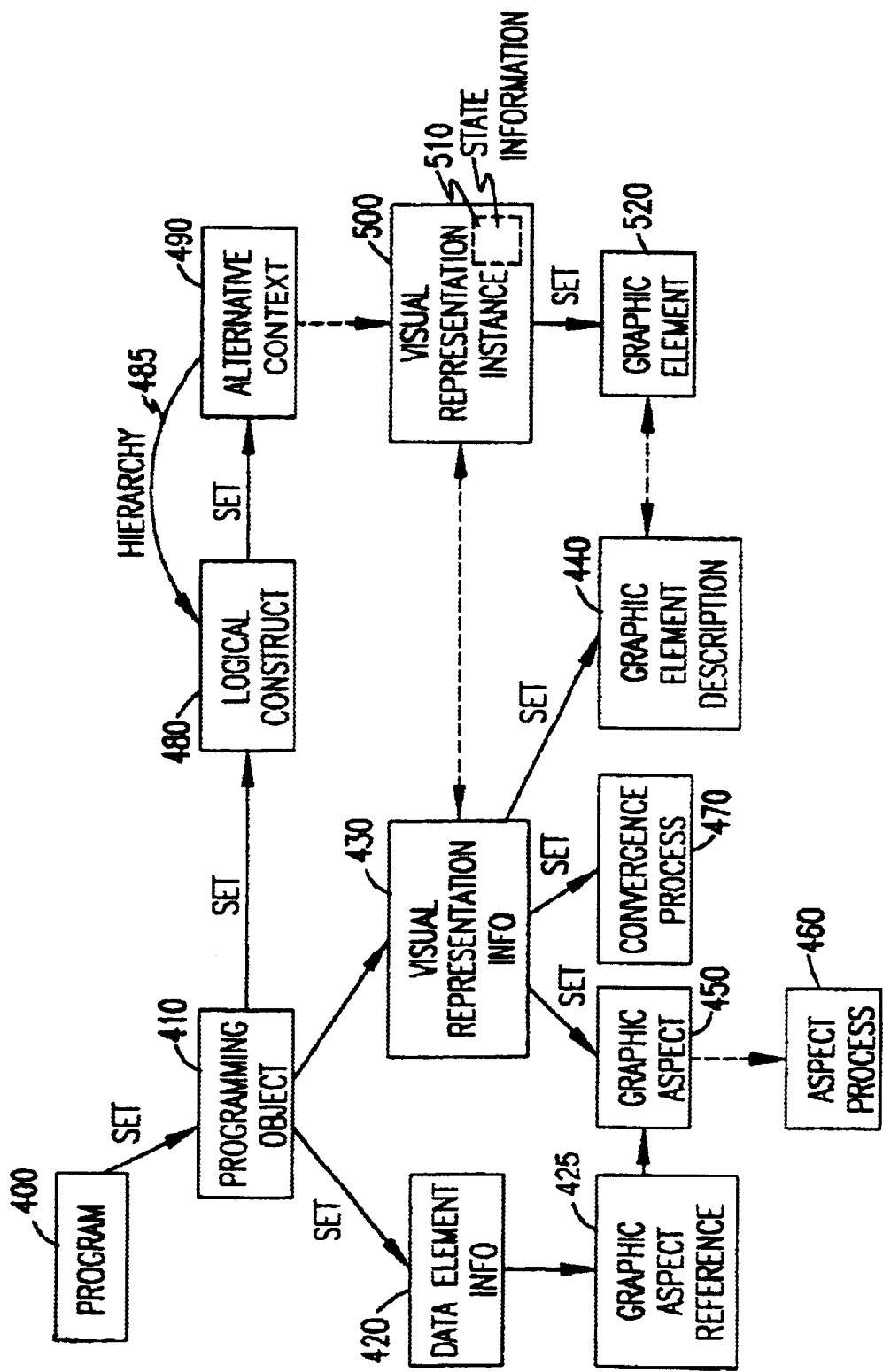
FIG. 4 is a block diagram showing the notions of divergence and convergence of programming objects induced by logical constructs.

Referring now to FIG. 4, there is a block diagram depicting the data structures used for this teaching, and the relationships amongst those data structures. Each computer program is represented by a program or data structure labeled program 400. The program has of a set of programming objects 410, each represented by a data structure. For example, a billing-programming object would have data elements representing programming objects for the customer's name, address, etc. The programming object has a set of data element information structures 420. Each data element information structure 420 has a set of graphic aspect references 425, each of which points to a graphic aspect structure 450, which is described later. The programming object 410 also references, or points to, a visual representation information structure 430 that describes a visual representation for this programming object. The visual representation information structure would have a set of graphic element descriptions 440, each of which describes graphical elements of various visual characteristics that comprise the visual representation of the programming element. Each graphic element description 440 provides sufficient information to construct or produce a graphical element as appropriate for use in a visual representation of a programming object. A programming object may have multiple visual representations, as described in copending application Ser. No. 09/409,277. This is easily accommodated by one skilled in the art of elementary software-design and, therefore, will not be dealt with here to simplify the discussion.

Each visual representation 430 also has a set of graphic aspects 450 that is a well-defined means of alteration of one or more graphical elements. Any number of implementations may be employed to implement a graphical aspect including but not restricted to rules-based processing, descriptive data, or even hand-written programs. The implementation means is designated as an aspect process 460 to which the graphic aspect 450 has access.

Again in FIG. 4, a visual representation has a set of convergence processes 470. A convergence process is one that accepts any number of visual representation states, such as will be described later, and produces a composite state, representing a converged state as discussed above. There may be a set of such process, any of which may be used in different contexts. For example, one may be used for IF convergence, another for CASE convergence.

A programming object 410 may have a set of logical constructs 480, such as IFs, CASEs, and LOOPs. Each logical construct has a set of alternative contexts 490, each representing a different path generated by the logical construct type. For example, an IF statement has exactly two alternative contexts for True/False execution paths. An alternative, in turn, may contain logical constructs, resulting in hierarchy 485. Each alternative context refers or points to a visual representation instance 500 for each programming object. This is a visual instance of the programming object for that context. It has a set of graphic elements 520 which are in one-to-one correspondence with the graphic element descriptions 440. Each visual representation instance 500 contains programming usage state information 510. This is information describing the programming state of the programming object as used in its context. As programming is done using the programming object in that alternative context, the state information 510 gets updated and reflected into the graphic element 520 using graphic aspects 450. As a further aspect of this model, we assume that each graphic element has an update method which, when called passing a state, 510, will update appropriately.

Figure 5:
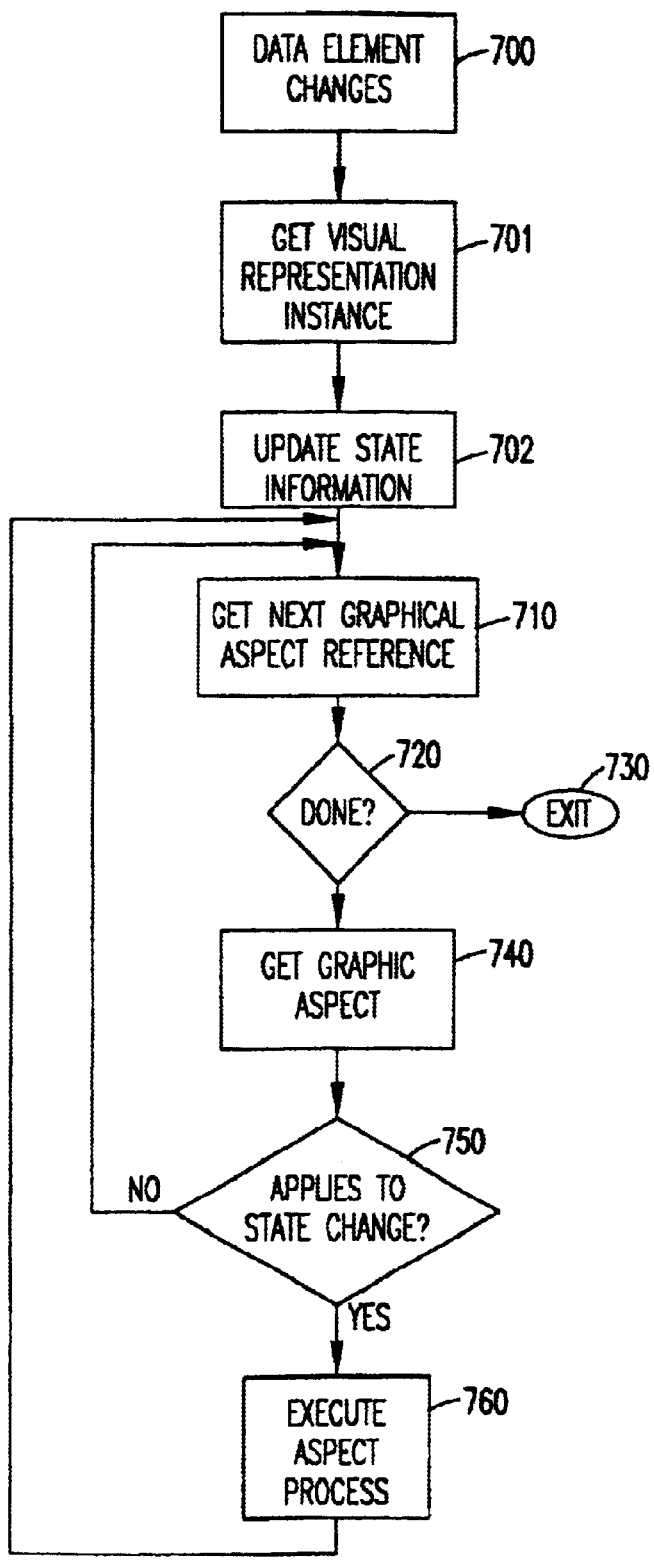
FIG. 5 is a flow diagram of the state update process.

Referring now to FIG. 5, there is shown a flow diagram of process of state management and reflection while programming within a visual programming language whereby a usage change in a data element within a programming object is reflected as a change in the object's programming state and reflected to a visual representation of the programming objects. The execution sequence begins with the detection of a change 700 in the state of a data element. Typically, this happens because in the course of programming activities of a visual programming language, a state change is called for on a programming object by the rules of the language and thus made in the normal course of editing within the visual programming language. That being the case, it can safely be assumed that at 700, the data element is known and acquired.

Again in FIG. 5, we now proceed to update the programming state of the appropriate visual representation instance 701. How the visual representation element is acquired is a matter of implementation of the visual programming language. Typically, the graphic elements (e.g., 520 in FIG. 4) would refer directly back to the instance. In brief, the manipulation of a graphic element would trigger a method with a reference to the graphic element, which in turn would provide a reference to the visual representation instance. This is a common means of access, as known to many skilled in the art of graphics or user interface programming. However, other means are possible, including but not restricted to providing identification tags for visual instances, and traversing the hierarchy of logical constructs and alternative contexts, as part of a search technique.

Having the visual representation instance, and based on the semantic action committed to the data element that changes, the state information of the visual representation is updated 702. As mentioned above, there is no precise definition to this state information, and it varies depending on the intention intended for the action relative to the data element for the visual programming language.

The logic now proceeds as in copending application Ser. No. 09/409,277. The next step involves a traversal of the list of graphical aspect references for the data element. Thus, an acquisition of the next graphical aspect reference is done 710. On the first instance of this step, the first graphical aspect reference is acquired. A check is made if the list traversal is finished 720. If so, an exit is made 730. Otherwise, reference is utilized to acquire the, graphic aspect 740. A check is then made as to whether this aspect should be applied regarding this state change 750. If not, the main loop continues with the acquisition of the next graphical aspect 710. If it does, the aspect process is executed 760, making appropriate changes to the visual representation. Control returns to acquiring the next graphical aspect 710.

Figure 6:
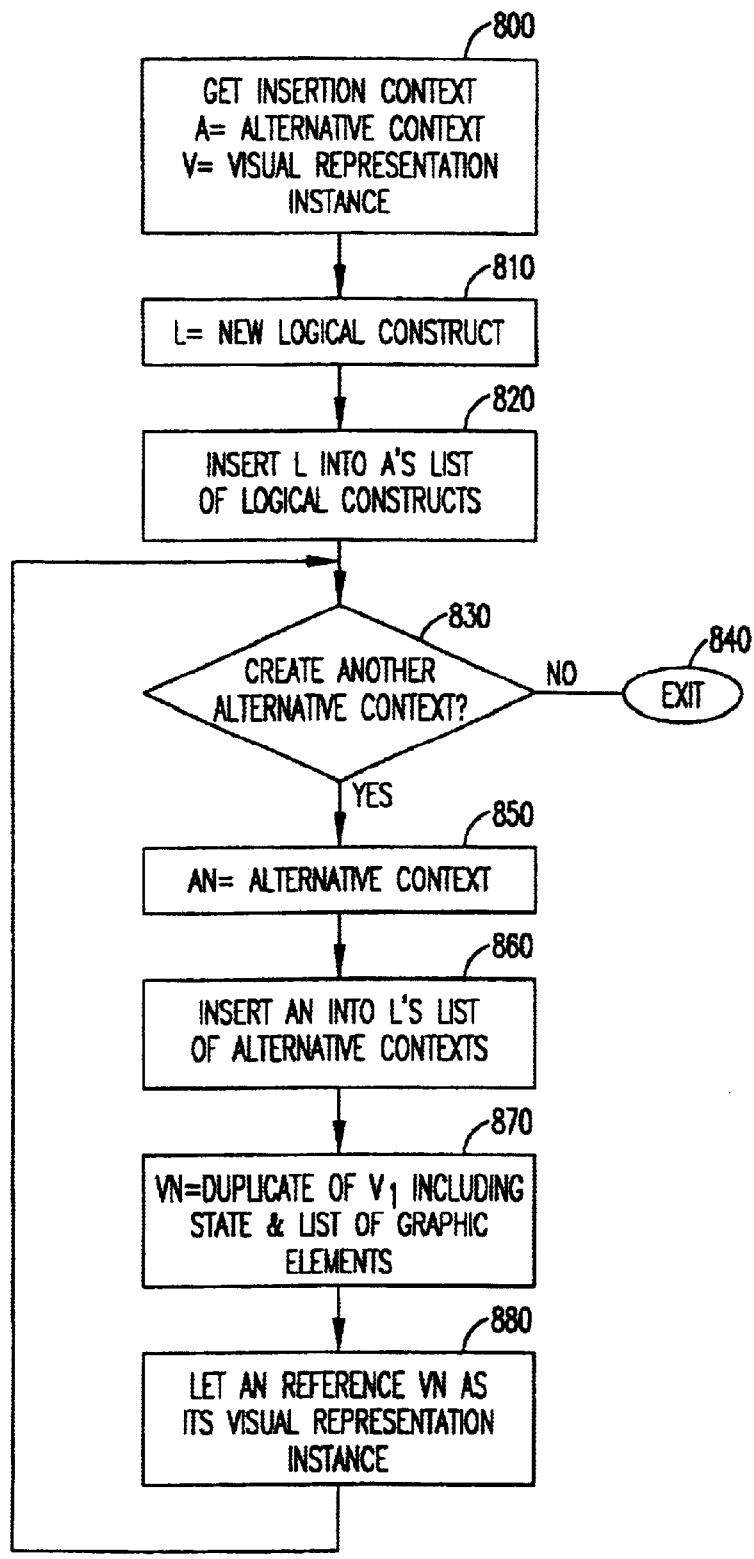
FIG. 6 is a flow block diagram of the state divergence process.

Referring now to FIG. 6, there is shown a process flow diagram illustrating the process of divergence. The divergence process is invoked when a logical construct, reflecting an IF, CASE or LOOP, is determined to be inserted into the program. The process begins with determining the alternative context into which the logical construct is to be inserted 800. This manner of determination is a matter of implementation of the visual programming language. Typically, a visual code editor's graphical context and the user's graphical action of intention to insert the logical construct provide a direct link to the alternative context for the point of insertion. With that alternative context, one easily obtains the visual representation instance just prior to the point of insertion. The graphical context, as part of a visual editor, would have reference to these as required data to present an editing view, for example. However, other means are possible, including but not restricted to providing tags for alternative and visual representation instances and traversing the hierarchy of logical constructs and alternative contexts, as part of a search technique.

Again in FIG. 6, a new logical construct is constructed 810. The type of logical construct, IF, CASE or LOOP, would be as determined from user input on the insertion action. This logical construct is inserted appropriately into the alternative context's list of logical constructs 820. Depending on the type of logical construct, a number of alternative contexts need to be inserted. Step 830 checks to see if another alternative needs to be added. If not, the process terminates 840. If another alternative needs to be added, a new alternative context is created 850. It is inserted into the newly created logical construct's list of alternative contexts 860. Next, a duplicate of the visual representation instance, as determined in step 800, is duplicated 870. This is an exact duplication, including the state information, and all the graphic elements. The new alternative context references this duplicate 880. Logic proceeds to step 830, to check for more alternatives.

Figure 7:
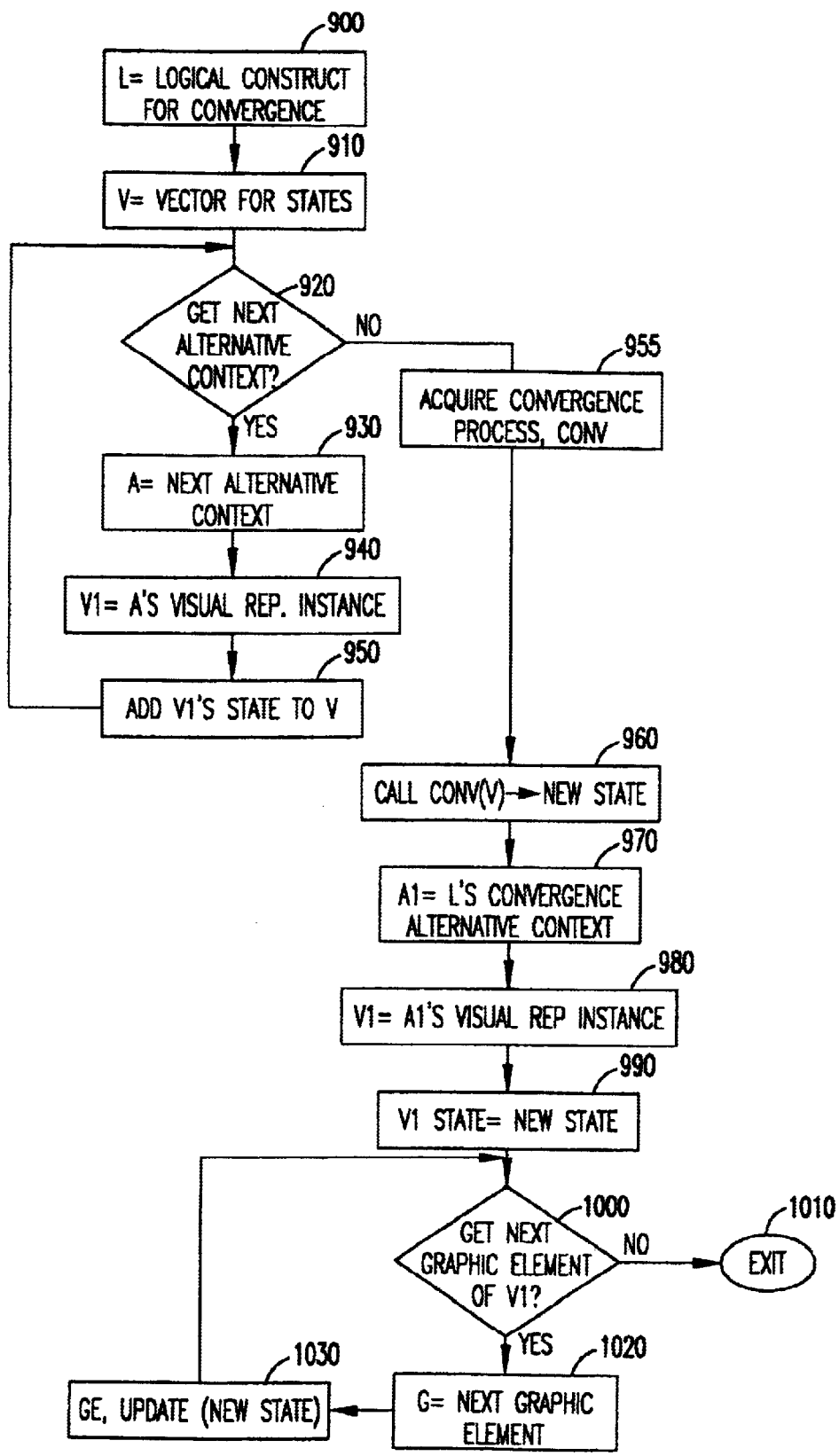
FIG. 7 is a flow diagram of the state convergence process.

Referring now to FIG. 7, there is shown a process block diagram illustrating the process of convergence. The convergence process is invoked when a logical construct is terminated. The objective of the process is to update the owning alternative context's visual representation instance's state and to reflect that state in its visuals. The process begins at 900 with obtaining the logical construct that will be converged. As in the prior discussion, this is usually obtained from, but not limited to, insitu graphical information or indirectly though identity tags and searches.

At step 910, a vector or array is constructed which will be used to hold all the state information from all the visual instances from all of its alternative contexts of this logical construct. By way of this process, at step 920 a test is made to see if we have not completed a traversal of alternative contexts. If true, we get the next alternative context A, at step 930. Then V1 is set to A's visual representation instance in step 940. This is the most current or otherwise last state that the visual representation has at the time of this operation. This is by way of context for this embodiment. In alternative embodiments, intermediate states may be examined, but for this algorithm only the last state of this alternative path would be used. Implementation of these alternative embodiments should be clear to anyone skilled in the art of program design given this algorithm. V1's state is added to the vector array in step 950. The test 920 is then continued. If the test at 920 is false, the convergence process for this visual representation is obtained in step 955. This is by way of back pointers from any visual representation instance, or otherwise traversing the data model of FIG. 4. The convergence process is invoked at 960, yielding a converged new state.

Next, the alternative context in which the logical construct resides, A1, is acquired in step 970. Again, this could be through back pointers on L, being a member of A1's logical construct list. The visual representation of A1, V1, is obtained in step 980. The state of V1 is then updated in step 990 with the new state.

As a final part of this operation, the visuals for V1 are updated with the new state. A test is made to determine if we can get a next graphic element 1000. If not, the process terminates. If yes, the next graphic element is acquired 1020. Then an update on the graphic element using the new state is processed 1030.

One skilled in the art of programming, using this disclosure and that of copending application Ser. No. 09/409,277, can easily generate multiple visual representations for a programming object and, similarly, for the representation for objects contained within other objects and for representations for objects sub-classed from other objects. I should also be clear for one skilled in the art of programming that the visual management aspects of this invention can be separated from the data management aspect. This provides the core of teaching in the context of computer of data representations of programming objects for alternative execution context.

Finally, it should also be clear that although loop logical construct provide only two alternative contexts for alternative logical paths, namely the body of the loop or the loop's "fall through", it is possible to apply the above teaching of the invention to an assumed number of iterations are supplied. To further explain, one could construct alternative logical paths for 0, 1, and so forth, each comprised of 0, 1, and so forth concatenations of the loop's body, up to some specified number of iterations. One skilled in the art of programming with this teaching would be able to supply this implementation.

The advantage of the present invention is that the updated state is a reflection of a combination of several possibilities that the programming object traverses during programming. The combined state reflects generally what is definitely known or unknown about the programming object after these traversals. It is also possible to give a more detailed accounting of the dynamic behavior of a program, as well as the data constructions and relations that evolve, all at program editing time.

While the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer implemented method of visual representation of programming objects as graphical elements, wherein programming properties of programming objects are reflected through graphical properties of graphical elements, the method comprising the steps of:

detecting a change in a state of a data element representing a programming object in visual representation and shown visually on a display device, wherein the data element represents a programming object as graphical elements and programming properties of programming objects are reflected though graphical element properties;

determining graphical aspect changes that apply to graphical elements of a programming object appropriate for a change in state;

applying the graphical aspect changes to corresponding graphical elements, wherein the graphical aspect changes include changes in color, position and size; and resolving alternative programming states of said programming object with a convergence operator defined on semantic state space of said programming object.

2. A computer implemented method for representing and computing a programming state of programming objects for a logical programming construct that define alternative paths, the method comprising the steps of:

at entry to a logical programming construct, for each alternative path, duplicating a programming state of each said programming object and assigned said value with said programming object for each alternative path; and at exit to an existing logical programming construct, resolving the programming states of each representation of programming state for each alternative path of each said programming object in said logical programming construct into one state for one representation of programming state for each said programming object using a convergence operator.

3. A computer implemented method as recited in claim 2, wherein for loop constructs having a loop body program, a specified number of iterations is represented as that number plus one of alternative paths, producing alternative paths as an empty context for a first iteration, one copy of said loop construct's body program for a second iteration, two sequential copies of said loop construct's body program for a third iteration, until the specified number of iterations is reached.

4. A computer implemented method as recited in claim 2, wherein the representation of programming objects and their programming state are reflected as graphical elements.

5. A computer implemented method as recited in claim 4, wherein the visual representation of a first programming object may include other visual representations corresponding to at least one additional object logically contained within the first programming object.

6. A computer implemented method as recited in claim 4, wherein a programming object may have more than one visual representation.

7. A computer implemented method as recited in claim 4, wherein a programming object may be sub-classed from another programming object.

8. An apparatus for visual representation of programming objects as graphical elements comprising:

a data processing system comprising a display device, an input device, a storage device, and a processor;

memory coupled to the processor via a bi-directional bus, wherein the memory includes a first memory section for at least on program and a second memory section for data;

computer code comprising a visual programming language, wherein the computer code is stored in the first memory section, and the computer code detects changes in state information corresponding to a data element, determines graphical aspect changes that apply to graphical elements of a programming object, applies graphic aspects to a visual representation of the data element which represents the state change, and resolves alternative programming states of said programming object with a convergence operator defined on semantic state space of said programming object; and display means for displaying the visual representation of a plurality of data elements on the display device.

9. A machine readable medium containing code for visual representation of programming objects as graphical elements, wherein programming properties of programming objects are reflected through graphical properties of graphical elements, the code implementing the steps of:

detecting a change in a state of a data element representing a programming object in visual representation and shown visually on a display device, wherein the data element represents a programming object as graphical elements and programming properties are reflected through graphical element properties;

determining graphical aspect changes that apply to graphical elements of the programming object appropriate for the change in state;

applying the graphical aspect changes to corresponding graphical elements, wherein the graphical aspect changes include changes in color, position and size; and resolving alternative programming states of said programming object with a convergence operator defined on semantic state space of said programming object.

\* \* \* \* \*